United States Patent Office 3,370,456
Patented Feb. 27, 1968

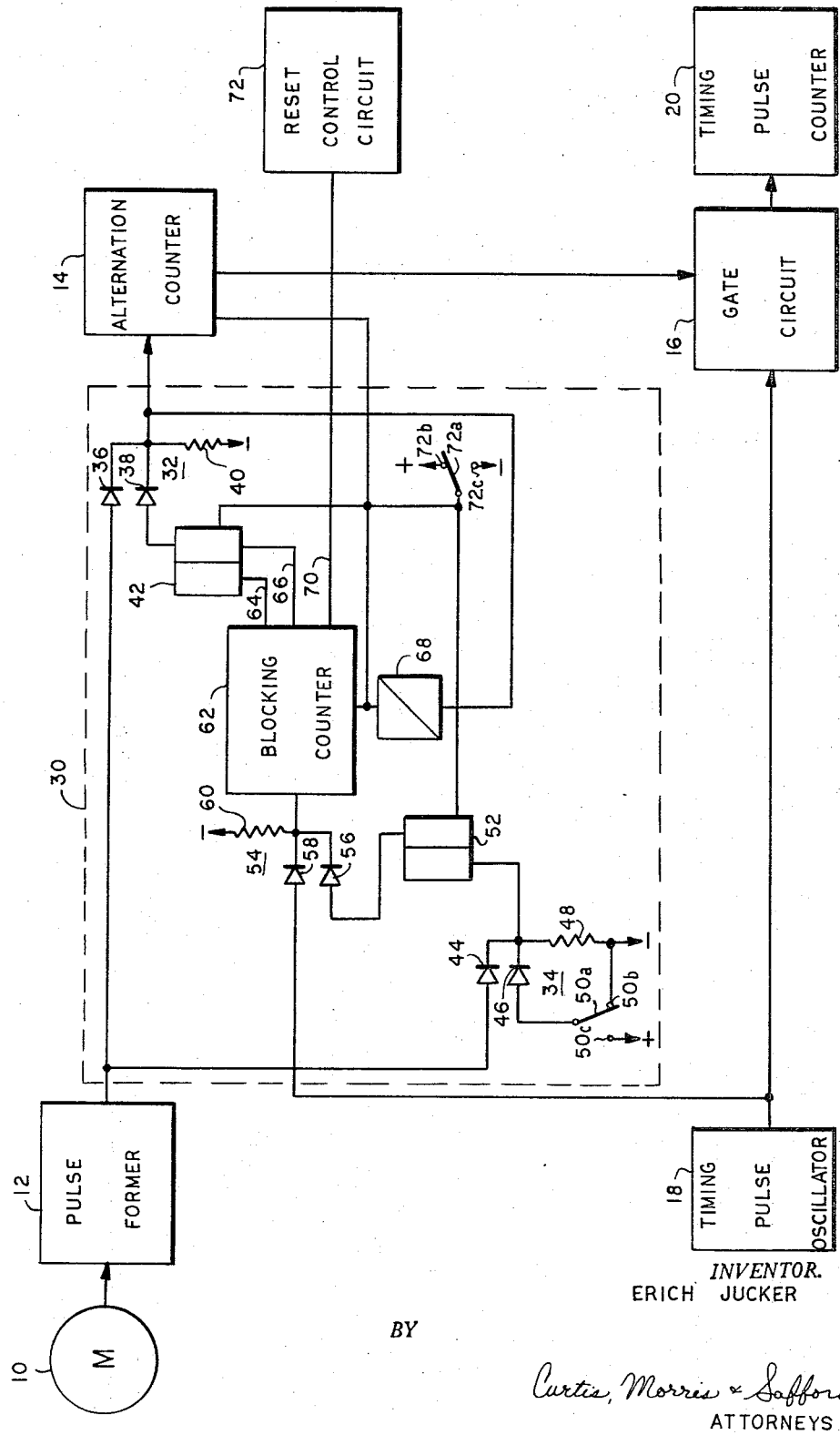

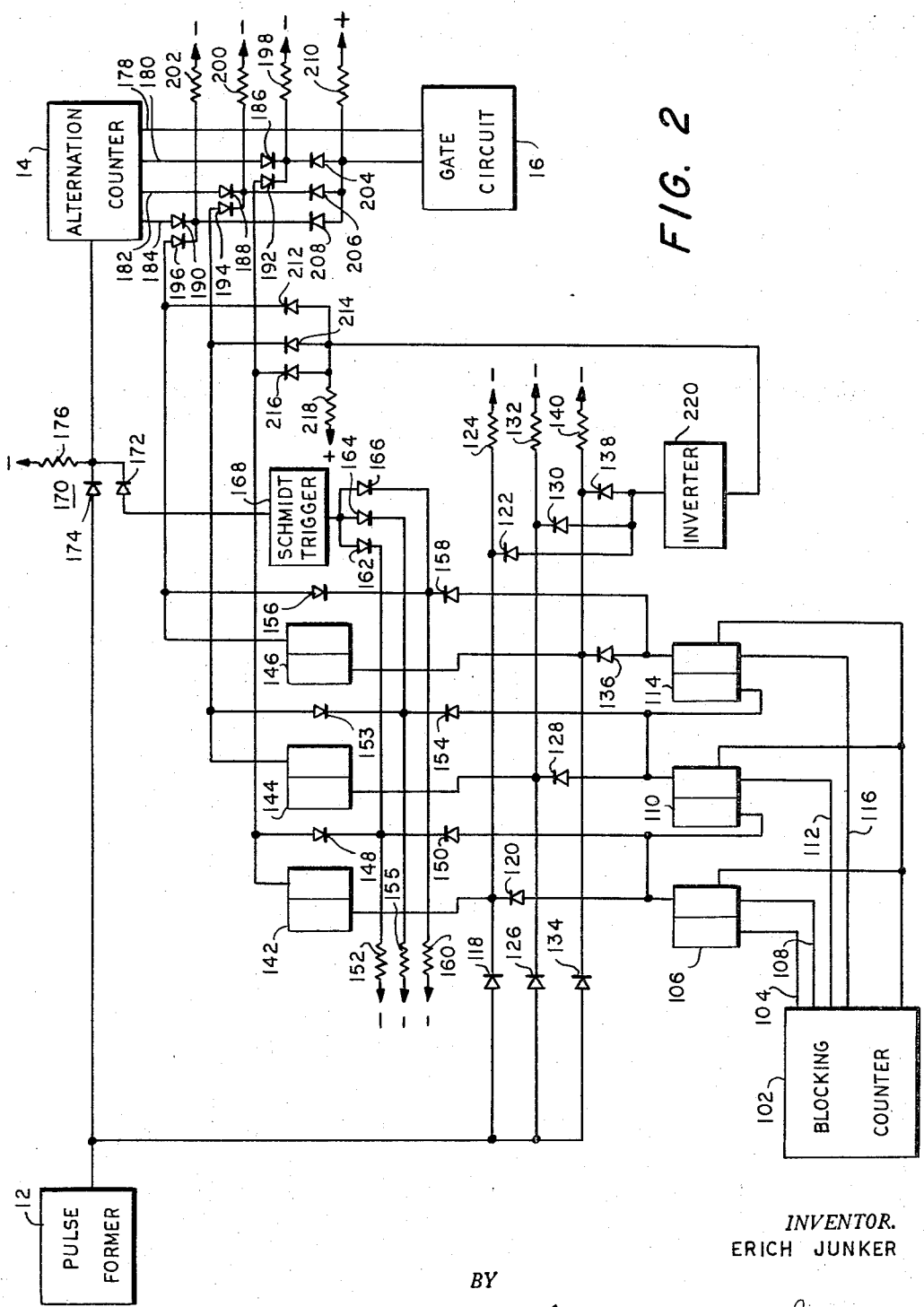

3,370,456
TIMEPIECE TESTING APPARATUS
Erich Jucker, La Chaux-de-Fonds, Switzerland, assignor to Portescap, Le Porte-Echappement Universel S.A., La Chaux-de-Fonds, Switzerland
Filed Feb. 18, 1966, Ser. No. 528,631
10 Claims. (Cl. 73—6)

The present invention relates, in general, to the testing of timepieces and, in particular, to apparatus for checking the rate of timepieces. Although reference will be made to the testing of a balance wheel of a watch movement, it will be readily apparent that the invention may be employed in testing other types of timepieces.

Digital counting techniques are commonly employed in equipment used to check the rate of watch movements. In such equipment, the rate of the movement under test is checked by determining the time required for the balance wheel to undergo a prescribed number of oscillations or alternations. An alternation is a change in direction of movement of the balance wheel as occurs when the balance wheel reaches an extreme point in its swing. An oscillation corresponds to the movement of the balance wheel from one extreme point to the other and back again to its original starting point. Thus, there are two alternations for each oscillation of the balance wheel.

Equipment for performing this type of measurement generally includes a sensing device which responds to the motion of the balance wheel of the movement under test and develops electrical signals in response to this motion. The sensing device may be acoustical in nature, such as a crystal or inductive microphone, or it may be based upon optical principles. By selecting a particular point in the motion of the balance wheel and by counting signals developed each time the balance wheel passes through this point, the alternations of the balance wheel are counted. At any particular count, the number of oscillations of the balance wheel is equal to half the alternation count. Normally, the electrical signals developed by the sensing device are supplied to a pulse former which simply provides the alternation counter with properly shaped input signals.

This alternation count is used to control the time measurement interval as follows. Timing pulses from a timing pulse oscillator, controlled, for example, by a quartz clock, pass through a gate circuit to a timing pulse counter. The condition of the gate circuit is controlled by the alternation counter. The gate circuit is opened at the initiation of the counting by the alternation counter so as to start the time measurement interval and is closed after the prescribed number of alternations have been counted so as to mark the end of the time measurement interval. During the time that the gate circuit is open, timing pulses are counted by the timing pulse counter. The rate of the watch movement under test is determined from the total count of the timing pulse counter, since this count is dependent upon the time required to count the prescribed number of alternations of the movement under test.

The usual procedure for checking the rate of a watch movement in a manufacturing test facility is to perform this test after the movement has been encased. Under such circumstances, it becomes necessary to use a microphone to sense the motion of the watch movement to develop the required electrical signals for counting the alternations of the watch movement. It has been found that microphones are susceptible to sensing parasitic noises, for example, secondary noises within the watch case itself or environmental noises from the test facility, so that signals developed in response to such parasitic noises undesirably set off the pulse former and result in an erroneous alternation count. In addition, electrical noises in the microphone lines also may undesirably register an alternation count. It becomes apparent that when employing equipment of the type under consideration only desired signals representing particular sounds of the watch movement under test be counted by the alternation counter. Otherwise, the time measurement interval controlled by the alternation counter is of improper duration leading to an erroneous count by the timing pulse counter.

It is an object of the present invention to provide new and improved timepiece testing apparatus.

It is another object of the present invention to provide new and improved apparatus which checks the rate of a watch movement by digital counting techniques.

It is a further object of the present invention to provide timepiece testing apparatus which provides accurate indications of the rate of a watch movement and which is reliable in operation.

The timepiece testing apparatus of the present invention is generally of the type described above. This apparatus, however, reduces substantially the effect of parasitic noises by maintaining the connection between the pulse former and the alternation counter for only a relatively short time interval during which pulses representative of the particularly selected sounds of the watch movement may be expected. At all other times, the connection between the pulse former and the alternation counter is interrupted so that parasitic noises sensed during these intervals of interrupted connection do not have an effect although they may cause the development of pulses by the pulse former.

For a better understanding of the present invention, together with other and further objects thereof, reference is made to the following description, taken in connection with the accompanying drawings, and its scope will be pointed out in the appended claims.

Referring to the drawings:

FIGURE 1 is a circuit diagram, partially in block form, of a first embodiment of timepiece testing apparatus constructed in accordance with the present invention;

FIGURE 2 is a circuit diagram of a second embodiment of timepiece testing apparatus constructed in accordance with the present invention.

Referring to FIGURE 1, a microphone 10, responsive to the sounds produced by a watch movement under test, develops electrical signals representative of these sounds. The microphone 10 may be similar to the one shown in U.S. Patent 3,026,707 to F. Marti et al. This microphone is provided with means for holding a watch movement in a number of different test positions. The microphone 10 senses the sounds of the movement and develops electrical signals in response to the sounds for each of the various test positions of the movement.

The sounds of the watch movement are produced as the balance wheel swings back and forth. One of the sounds, commonly called the "unlocking" sound, is produced by the impact of the impulse-pin against one edge of the lever-notch and marks the beginning of the angle of lift of the balance wheel. The unlocking sound, produced once during each swing of the balance wheel, may be used as the basis for counting alternations of the balance wheel of the movement under test.

The signals from the microphone 10 are supplied to a pulse former 12 of conventional construction and operation. The pulse former 12, responding to the signals representative of the unlocking sounds, develops output pulses of prescribed characteristics in response to these signals. In addition, any signals supplied to the pulse former 12, due to parasitic noises or electrical noise, which are of sufficient amplitude also are apt to cause the pulse former to develop output pulses. For the particular circuit being described, the output pulses from the pulse former 12 are negative going as illustrated by waveform (a) in FIGURE 3a.

The output pulses from the pulse former 12 are supplied to a control circuit 30 to be described in more detail hereinafter. Some of the output pulses from the pulse former 12 will pass through the control circuit 30 to an alternation counter 14. Counter 14 may be of conventional construction and operation. The remainder of the output pulses from pulse former 12 are not passed by the control circuit. It will be seen that pulses from the pulse former 12 developed in response to the unlocking sounds, if occurring at the proper rate, are passed to the alternation counter 14, while other pulses are prevented from passing to the alternation counter.

Figure 3A:
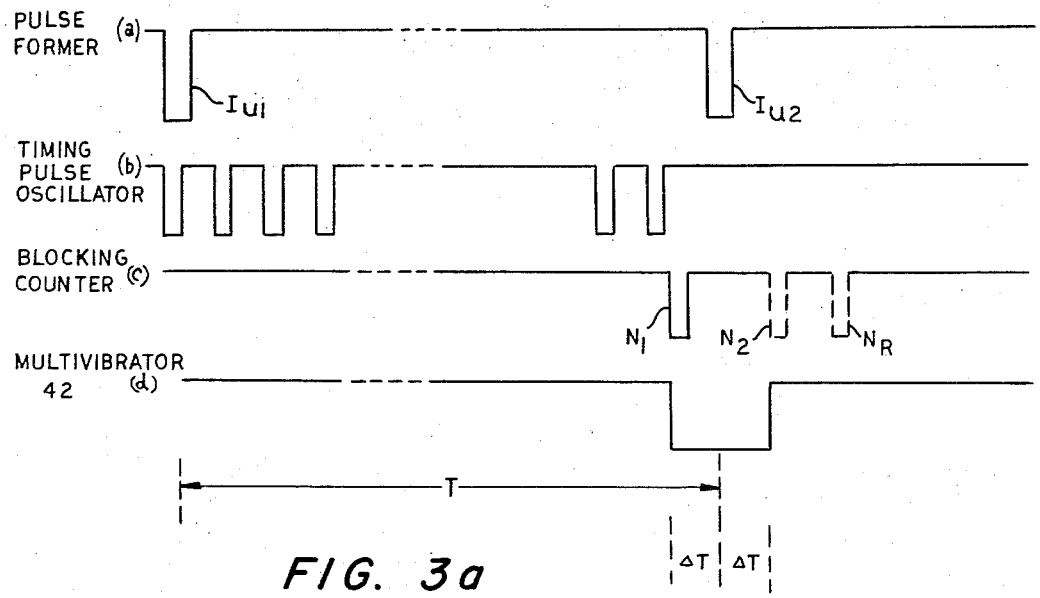
FIGURES 3a and 3b show waveforms which are useful in understanding the operation of the present invention.

The first pulse $I_u$ which passes to the alternation counter 14 causes the alternation counter to open a gate circuit 16. When the gate circuit 16 is open, negative going pulses from a timing pulse oscillator 18, shown in waveform (b) of FIGURE 3a, are permitted to pass to a timing pulse counter 20. The timing pulse oscillator 18 may be a pulse generator of conventional design which develops a pulse train. The pulses occur at a prescribed rate which is controlled by an accurate source such as a quartz clock. The timing pulse counter 20 also may be of conventional design. After a prescribed number of pulses from the pulse former 12 are counted by the alternation counter 14, the gate circuit 16 is closed, thereby interrupting the passage of pulses from the timing pulse oscillator 18 to the timing pulse counter 20. The total count of the timing pulse counter 20 corresponds to the rate of the watch movement under test. Since the first pulse which passes to the alternation counter 14 marks the start of the time measurement interval during which the gate circuit 16 is to be open, this pulse should not contribute to the total count required before the alternation counter closes the gate circuit. This result may be accomplished by setting the alternation counter to a count of "minus one" when the apparatus is set initially or by requiring the alternation counter to register an extra count before the gate circuit 16 is closed.

The negative pulses from the pulse former 12 are supplied simultaneouly to two AND gates 32 and 34 in the control circuit 30. AND gate 32 includes a pair of diodes 36 and 38 and a resistor 40 connected to a source of negative potential. The anode of diode 36 is connected to the pulse former 12, while the anode of diode 38 is connected to the output of a bistable multivibrator 42 of conventional construction and operation. Initially, the multivibrator 42 is in its "0" state with its output at zero volts. This conditions the AND gate 32 to prevent the negative pulses from the pulse former 12 from passing through to the alternation counter 14.

The AND gate 34 includes a pair of diodes 44 and 46 and a resistor 48 connected to a source of negative potential. The anode of diode 44 is connected to the pulse former 12, while the anode of diode 46 is connected to a switch blade 50a. The switch blade 50a contacts either of a pair of terminals 50b or 50c. Terminal 50b is connected to the source of negative potential to which resistor 48 is connected, while terminal 50c is connected to a source of positive potential. The output of AND gate 34 is connected to a bistable multivibrator 52 of conventional construction and operation.

With the switch blade 50a in contact with terminal 50b, as shown, multivibrator 52 is in its "0" state with its output at zero volts. In addition, the AND gate 34 is conditioned to permit negative pulses from the pulse former 12 to pass to the multivibrator 52. The output of the multivibrator 52 is connected to an AND gate 54 composed of a pair of diodes 56 and 58 and a resistor 60 connected to a source of negative potential. The anode of diode 56 is connected to the multivibrator 52, while the anode of diode 58 is connected to the timing pulse oscillator 18. With the output of the multivibrator 52 at zero volts, the AND gate 54 is conditioned to prevent the negative pulses from the timing pulse oscillator 18 from passing through AND gate 54.

The output of the AND gate 54 is connected to a blocking counter 62 which may be, for example, a conventional binary counter. The blocking counter 62 counts the negative timing pulses and generates control pulses after prescribed counts have been reached. These control pulses $N_1$, $N_2$ and N are shown in waveform (c) of FIGURE 3a.

The first negative pulse $I_u$ from the pulse former 12 to pass through the AND gate 34 to the multivibrator 52 causes the multivibrator 52 to flip into its "1" state so that its output voltage drops to a negative value. This, in turn, conditions the AND gate 54 to permit the negative timing pulses from the timing pulse oscillator 18 to pass through the AND gate 54 to the blocking counter 62.

The negative timing pulses from the timing pulse oscillator 18 are counted by the blocking counter 62 and after a prescribed number of counts the blocking counter generates the first control pulse $N_1$. Control pulse $N_1$ is generated at a time:

$$T - \Delta T$$

where:
T is the time between the development of successive unlocking sounds of a watch movement having a proper rate; and
$\Delta T$ is the range over which the rate of movement may vary in a single day and still be acceptable.

The control pulse $N_1$ is supplied along a line 64 at the output of the blocking counter 62 to the multivibrator 42. This control pulse flips the multivibrator 42 into its "1" state so that its output voltage drops to a negative value. This is shown in waveform (d) of FIGURE 3a. With the output of the multivibrator 42 negative, the AND gate 32 is conditioned to pass negative pulses from the pulse former 12. A second negative pulse $I_{u2}$ from the pulse former, occurring while the output of the multivibrator 42 is at a negative value, passes to the alternation counter 14 and is counted.

At time $T+\Delta T$ the blocking counter 62, if still counting, generates a second control pulse $N_2$ which is shown dotted in waveform (c) of FIGURE 3a. This control pulse, supplied to the multivibrator 42 along an output line 66 from the blocking counter 62, returns the multivibrator 42 to its "0" state. This returns the output of the multivibrator 42 to zero volts so as to condition the AND gate 32 to prevent the passage of pulses from the pulse former 12.

It is seen from the foregoing that negative pulses $I_u$ from the pulse former 12 which occur before time $T-\Delta T$ or after time $T+\Delta T$ are not passed to the alternation counter 14 and are, therefore, not counted. On the other hand, pulses occurring during this time interval are passed through the AND gate 32 to the alternation counter 14 and are counted. Those negative pulses from the pulse former 12 which are passed by the AND gate 32 also trigger a monostable multivibrator 68, of conventional construction and operation, which resets the blocking counter 62 to zero count and returns the multivibrator 42 to its "0" state. The pulse $N_2$ generated by the blocking counter 62 is shown dotted in waveform (c) since this pulse is generated only if a pulse from the pulse former 12 does not occur during the prescribed time interval over which AND gate 32 is conditioned to pass pulses from the pulse former. If the pulses from the pulse former 12 do not occur at the proper times, the multivibrator 68 is not triggered and the blocking counter continues to count. In this case, the pulse $N_2$ is needed to mark the end of the time interval during which the AND gate 32 passes pulses and to reset the multivibrator 42. The blocking counter 62 generates a third control pulse $N_R$ if the pulses from the pulse former 12 do not occur at the proper times. Control pulse $N_R$ is generated at a time shortly after time $T+\Delta T$ and is supplied along an output line 70 from the blocking counter 62 to a reset control circuit 72 which serves to reset all the counters and restart the measurement cycle.

In order to reduce the effect of parasitic noises as much as posible, the time interval during which the AND gate 32 is conditioned to pass pulses from the pulse former 12 is made as short as possible. On the other hand, this time interval must be long enough to take into consideration an acceptable variation in the daily rate of a watch movement under test. For a movement making 18,000 alternations per hour, a typical time interval during which the AND gate is held open is 20 milliseconds.

A typical count after which the alternation counter 14 closes the gate circuit 16 is "30" for a watch movement making 18,000 alternations per hour. This means that "32" negative pulses from the pulse former 12 are needed for the first measurement cycle. The first negative pulse is supplied simultaneously to AND gates 32 and 34. AND gate 32 at this time is blocked but is subsequently opened because of the events initiated by the first pulse. AND gate 32 is open at the time of the second pulse from the pulse former 12. This second pulse from the pulse former 12 is the first pulse actually passed to the alternation counter 14. As previously indicated, this pulse, marking the opening of the gate circuit 16, should not contribute to the total count required to close the gate circuit. Therefore, two additional pulses are required.

A switch blade 72a, movable between a pair of terminals 72b and 72c to which sources of positive and negative potential, respectively, are connected, is used in conjunction with switch blade 50a to reset the various multivibrator circuits to their initial conditions before the start of a measurement cycle.

FIGURE 2 shows a second embodiment of timepiece testing apparatus constructed in accordance with the present invention. The apparatus of FIGURE 2, besides utilizing the principles of operation of the apparatus of FIGURE 1 in reducing substantially the effect of parasitic noises, also provides for developing an indication of the rate of a watch movement under test known to be oscillating at one of a number of rates. The apparatus of FIGURE 2 will be described in connection with the testing of movements oscillating at 2.5 c.p.s., 2.75 c.p.s. or 3 c.p.s. corresponding to 18,000, 19,800 and 21,000 alternations per hour. The times between unlocking sounds for these three rates are 200 milliseconds, 181.8 milliseconds and 166.7 milliseconds, respectively.

Because the operation of certain portions of the apparatus of FIGURE 2 is similar to the operation of the apparatus of FIGURE 1, detailed descriptions of these portions of the FIGURE 2 apparatus have been omitted. Elements in FIGURE 2 corresponding to elements in FIGURE 1 have been given the same reference numerals.

The first negative pulse $I_{u1}$ from the pulse former 12, shown in waveform (a) in FIGURE 3b, causes the blocking counter 102 to start counting in the same manner as described in connection with FIGURE 1. At time $T_3-\Delta T_3$, for example, after 160 milliseconds have elapsed, the blocking counter 102 generates a first control pulse $N_1$ shown in waveform (e) of FIGURE 3b. This control pulse is supplied along a line 104 from the output of the blocking counter 102 to a bistable multivibrator 106 of conventional construction and operation. Multivibrator 106, initially in its "0" state, flips into its "1" state in response to control pulse $N_1$.

At time $T_3+\Delta T_3$, for example, after 173 milliseconds have elapsed, the blocking counter 102, if still counting, generates a second control pulse $N_2$. This control pulse is supplied along a line 108 from the output of the blocking counter 102 to the multivibrator 106. Multivibrator 106 returns to its "0" state in response to control pulse $N_2$.

Figure 3B:
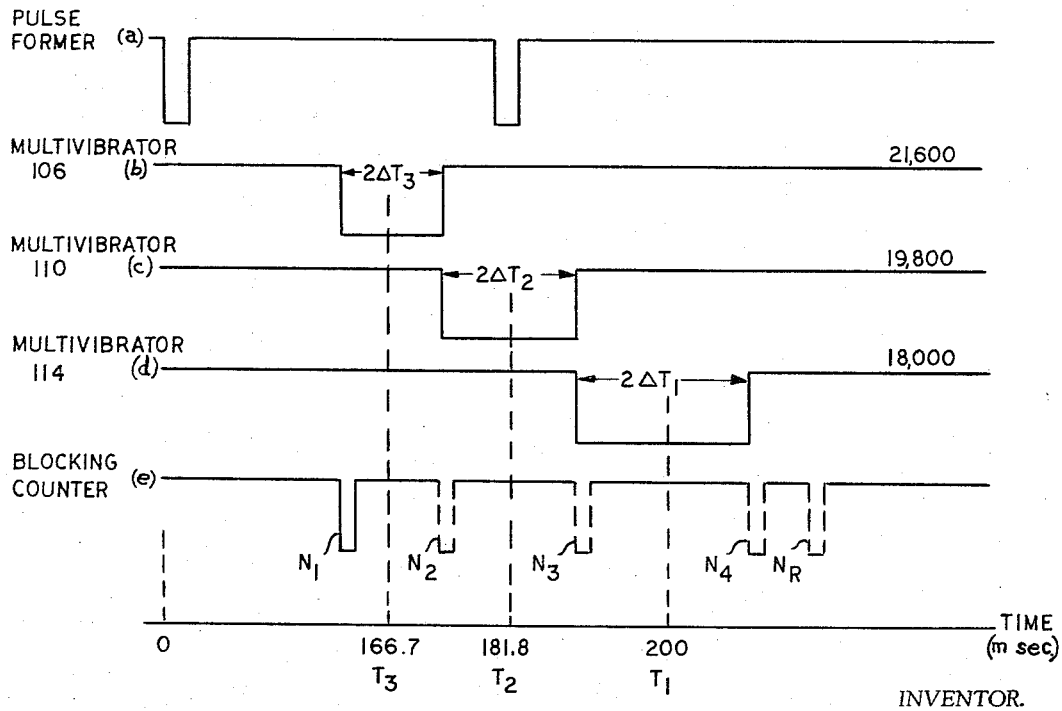

The changes in state of multivibrator 106 are shown in waveform (b) of FIGURE 3b. The interval designated $2\Delta T_3$ corresponds to the time during which multivibrator 106 is in its "1" state and has a duration of, for example, 13 milliseconds.

When multivibrator 106 returns to its "0" state, it causes a bistable multivibrator 110, of conventional construction and operation and initially in its "0" state, to flip into its "1" state. At time $T_2+\Delta T_2$, for example, after 190 milliseconds have elapsed, the blocking counter 102, if still counting, generates a third control pulse $N_3$. This control pulse is supplied along a line 112 from the output of the blocking counter 102 to the multivibrator 110. Multivibrator 110 returns to its "0" state in response to control pulse $N_3$. The changes in state of multivibrator 110 are shown in waveform (c) of FIGURE 3b. The interval designated $2\Delta T_2$ corresponds to the time during which multivibrator 110 is in its "1" state and has a duration of, for example, 17 milliseconds.

When mulutivibrator 110 returns to its "0" state, it causes a bistable multivibrator 114, of conventional construction and operation and initially in its "0" state, to flip into its "1" state. At time $T_1+\Delta T_1$, for example, after 210 milliseconds have elapsed, the blocking counter 102, if still counting, generates a fourth control pulse $N_4$. This control pulse is supplied along a line 116 from the output of the blocking counter 102 to the multivibrator 114. Multivibrator 114 returns to its "0" state in response to control pulse $N_4$. The changes in state of multivibrator 114 are shown in waveform (d) of FIGURE 3b. The interval designated by $2\Delta T_1$ corresponds to the time during which multivibrator 114 is in its "1" state and has a duration of, for example, 20 milliseconds.

Associated with each of the output circuits of multivibrator 106, 110, and 114 is an AND gate. In particular, a first AND gate comprising diodes 118, 120 and 122 and a resistor 124 connected to a source of negative potential, is associated with multivibrator 106. A second AND gate comprising diodes 126, 128 and 130 and a resistor 132 connected to a source of negative potential is associated with multivibrator 110. A third AND gate comprising diodes 134, 136 and 138 and a resistor 140 connected to a source of negative potential is associated with multivibrator 114.

The negative pulses from the pulse former 12 are supplied simultaneously to the three AND gates just described in that diodes 118, 126 and 134 are connected to the output of the pulse former. The AND gates are so arranged that a negative pulse from the pulse former 12 passes through the AND gate associated with the multivibrator 106, 110 or 114 which is in its "1" state at the time of the occurrence of the negative pulse. This pulse is passed to one of the three bistable multivibrators 142, 144 and 146 all of conventional construction and operation. The particular multivibrator 142, 144 or 146 to which the negative pulse is supplied is dependent upon which of the AND gates is conditioned to pass the pulse. All three of the multivibrators 142, 144 and 146 are initially in their "0" states. When a negative pulse from the pulse former 12 is passed to one of these multivibrators, the multivibrator receiving the pulse is switched to its "1" state.

Associated with each of the output circuits of multivibrators 142, 144 and 146 is an AND gate. In particular, a first AND gate comprising a pair of diodes 148 and 150 and a resistor 152 connected to a source of negative voltage is associated with multivibrator 142. A second AND gate comprising a pair of diodes 153 and 154 and a resistor 155 connected to a source of negative potential is associated with multivibrator 144. A third AND gate comprising a pair of diodes 156 and 158 and a resistor 160 connected to a source of negative potential is associated with multivibrator 146.

The three AND gates just described are connected to an OR circuit comprising diodes 162, 164 and 166. The output of the OR circuit is connected to a Schmitt trigger circuit 168 of conventional construction and operation. Connected to the output of the Schmitt trigger circuit 168 is an AND gate 170 comprising a pair of diodes 172 and 174 and a resistor 176 connected to a source of negative potential. Negative pulses from the pulse former 12, if occurring at the proper times, pass through AND gate 170 to the alternation counter 14.

When one of the multivibrators 142, 144 or 146 is triggered by a negative pulse from the pulse former 12, the AND gate connected to the output of this triggered multivibrator is conditioned to provide an input signal to the Schmitt trigger circuit 168 through the particular diode 162, 164 and 166 to which the associated AND gate is connected. The Schmitt trigger circuit 168, when set off, conditions the AND gate 170 to permit negative pulses from the pulse former 12 to pass to the alternation counter 14 to be counted. Although not shown in FIGURE 2, a negative pulse passed by the AND gate 170 also serves to set off a monostable multivibrator which, in turn, resets the blocking counter 102 and the particular multivibrator 106, 110 and 114 which happens to be in its "1" state at the time that the negative pulse is passed. This is similar to the function performed by the monostable multivibrator 68 in FIGURE 1.

Interposed between the alternation counter 14 and the gate circuit 16 is a logic circuit through which the control of the gate circuit by the alternation counter is effected. The alternation counter is shown as having four output lines 178, 180, 182 and 184. Output line 178 serves to couple a control signal from the alternation counter 14 to the gate circuit 16 in response to the first negative pulse passed by the AND gate 170. This signal marks the opening of the gate circuit 16. The other three outputs of the alternation counter 180, 182 and 184 serve to couple the control signals which close the gate circuit 16. Output line 180 is connected to a diode 186; output line 182 is connected to a diode 188; and output line 184 is connected to a diode 190. Associated with each of the diodes 186, 188 and 190 are diodes 192, 194 and 196, respectively, connected to the outputs of multivibrators 142, 144 and 146, respectively. Three resistors 198, 200 and 202, respectively, are connected to the junctions of diodes 186 and 192, 188 and 194, and 190 and 196 so as to form three AND gates. Also connected to these junctions are diodes 204, 206 and 208 which together with a resistor 210 connected to a source of positive potential form an OR circuit at the input to gate circuit 16.

When any of the multivibrators 142, 144 or 146 is in its "1" state, the associated AND gate in the logic circuit interposed between the alternation counter 14 and the gate circuit 16 is conditioned to permit the passage of a control signal from the alternation counter to the gate circuit to close the gate circuit. Such a signal is supplied from the alternation counter 14 if the alternation counter has reached the prescribed count. At the same time, a signal is coupled through an OR gate comprising diodes 212, 214 and 216 and a resistor 218 connected to a source of positive potential to an inverter circuit 220 of conventional construction and operation. The output of the inverter circuit 220 is connected to the AND gates connected to the outputs of the multivibrators 106, 110 and 114 and so conditions these AND gates as to prevent pulses from the pulse former 12 to be passed to any of the multivibrators 142, 144 and 146 until after these multivibrators have been reset.

A fuller understanding of the operation of the apparatus of FIGURE 2 may be had by a particular example. It will be assumed in this example that the watch movement under test undergoes 19,800 alternations per hour. This means that properly timed pulses from the pulse former 12 are spaced apart in time by 181.8 milliseconds and that the interval during which these pulses may pass through the AND gate 170 is 13 milliseconds in duration.

The first pulse from the pulse former 12 causes the blocking counter 102 to start counting. After 160 milliseconds, the blocking counter 102 generates control pulse $N_1$ which changes the state of multivibrator 106 to its "1" state. This, in turn, conditions the AND gate associated with the output circuit of multivibrator 106 to permit negative pulses from the pulse former 12 to pass through this AND gate to multivibrator 142. If no pulse occurs during the time interval $T_3-\Delta T_3$ to $T_3+\Delta T_3$, the blocking counter, continuing to count, generates control pulse $N_2$ which resets multivibrator 106. This, in turn, changes the state of multivibrator 110 and conditions the AND gate associated with the output circuit of multivibrator 110 to permit the passage of pulses from the pulse former 12 to multivibrator 144. Since pulse $I_{u2}$ occurs during the interval in which multivibrator 110 is in its "1" state, this pulse is passed to multivibrator 144 and changes the state of multivibrator 144 to its "1" state. The change in state of multivibrator 144 provides an input to Schmitt trigger circuit 168 which, in turn, conditions AND gate 170 to permit the passage of the next pulse from the pulse former 12 to the alternation counter 14. The first pulse passed to the alternation counter 14 causes a control signal to be coupled along line 178 from the alternation counter to the gate circuit 16. This signal opens the gate circuit 16. The first pulse which passes through the AND gate 170 also resets the blocking counter 102 and the multivibrator 110. This, in turn, resets multivibrator 144. This cycle of operation is repeated until the count of the alternation counter reaches "33." When the count of the alternation counter 14 reaches "33," a control signal is coupled through the logic circuit interposed between the alternation counter and the gate circuit 16 to close the gate circuit.

In checking the rate of a movement making 21,600 alternations per hour, an alternation count of "36" would be required, for example, before the gate circuit 16 is closed, while for a movement making 18,000 alternations per hour, an alternation count of "30" would be required, for example.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

What is claimed is:
1. Timepiece testing apparatus comprising:
sensing means for sensing the motion of a timepiece under test and for developing alternation signals corresponding in number to the number of alternations which the oscillating member of said timepiece undergoes;
first counting means responsive to said sensing means for counting said alternation signals and for developing a first control signal at the initiation of said counting of said alternation signals and a second control signal after a prescribed number of said alternation signals have been counted;
timing control means responsive to said alternation signals for preventing said first counting means from responding to said sensing means except during prescribed time intervals occurring at the times at which alternation signals should occur if the rate of said oscillating member is proper;
a source of timing signals occurring at a prescribed rate;
second counting means for counting said timing signals; and means responsive to said first control signal for permitting said timing signals to pass to said second counting means to count said timing signals and responsive to said second control signal for preventing said timing signals from passing to said second counting means.

2. Apparatus according to claim 1 wherein the sensing means include an acoustical device which develops electrical alternation signals in response to the sounds produced by the movement of the timepiece.

3. Apparatus according to claim 2 wherein the timing control means include a gate circuit through which the alternation signals pass to the first counting means during the prescribed time intervals.

4. Apparatus according to claim 3 wherein the sensing means further include a pulse forming circuit interposed between the acoustical device and the timing control means which develops pulses of prescribed characteristics in response to the alternation signals.

5. Timepiece testing apparatus comprising:
acoustical sensing means for sensing the sounds produced by the movement of a timepiece under test and for developing electrical alternation signals corresponding in number to the number of alternations which the oscillating member of said time piece undergoes;
a first counter for counting said electrical alternation signals and for developing a first gating signal at the initiation of said counting of said electrical alternation signals and a second gating signal after a prescribed number of said electrical alternation signals have been counted;
timing control means responsive to said electrical alternation signals for preventing said electrical alternation signals from passing to said first counting means except during prescribed time intervals occurring at times at which electrical alternation signals should occur if the rate of said oscillating member is proper;
an oscillator for supplying timing signals at a prescribed rate;
a second counter for counting said timing signals;
and a gate circuit interposed between said oscillator and said second counter responsive to said first gating signal for passing said timing signals to said second counter to count said timing signals and responsive to said second gating signal for blocking the passage of said timing signals to said second counter.

6. Apparatus according to claim 5 wherein the timing control means include a second gate circuit through which the alternation signals pass to the first counter during the prescribed time intervals.

7. Apparatus according to claim 6 wherein the timing control means further include a counter responsive to the timing signals for developing control signals which open the second gate circuit to pass alternation signals for prescribed time intervals during which alternation signals should occur if the rate of the oscillating member under test is proper.

8. Timepiece testing apparatus comprising:
sensing means for sensing the motion of a timepiece under test and for developing alternation signals corresponding in number to the number of alternations which the oscillating member of said timepiece undergoes;
first counting means responsive to said sensing means for counting said alternation signals and for developing a first gating signal at the initiation of said counting of said alternation signals and a plurality of additional gating signals as the count of said alternation signals reaches prescribed values;
timing control means responsive to said alternation signals for preventing said first counting means from responding to said sensing means except during one of a plurality of different repetitive time intervals occurring at the times at which alternation signals should occur if the rate of said oscillating member is proper and one of a selected plurality of rates and further for developing a plurality of repetitive control signals at the rate of said alternation signals;
a source of timing signals occurring at a prescribed rate;
second counting means for counting said timing signals;
a gate circuit responsive to said first gating signal for permitting said timing signals to pass to said second counting means to count said timing signals and responsive to a selected one of said plurality of additional gating signals for preventing said timing signals from passing to said second counting means;
and means interposed between said first counting means and said gate circuit and responsive to said plurality of repetitive control signals for selecting one of said plurality of additional gating signals dependent upon the rate of said alternation signals and for passing said selected gating signal to said gate circuit.

9. Apparatus according to claim 8 wherein the timing control means include a second gate circuit through which the alternation signals pass to the first counter during the presecribed time intervals.

10. Apparatus according to claim 9 wherein the timing control means further include a counter responsive to the timing signals for developing additional control signals which open the second gate circuit to pass alternation signals for one of a plurality of different repetitive intervals occurring at the times at which alternation signals should occur if the rate of the oscillating member under test is proper and one of a selected plurality of rates.

References Cited
UNITED STATES PATENTS

| | | | |
|---|---|---|---|
| 3,002,371 | 10/1961 | Borer | 73—6 |
| 3,255,625 | 6/1966 | Ellison | 73—6 |

LOUIS R. PRINCE, *Primary Examiner.*

NEIL B. SEIGEL, *Assistant Examiner.*